(12) United States Patent
Harris et al.

(10) Patent No.: US 7,265,881 B2
(45) Date of Patent: Sep. 4, 2007

(54) METHOD AND APPARATUS FOR MEASURING ASSEMBLY AND ALIGNMENT ERRORS IN SENSOR ASSEMBLIES

(75) Inventors: Rodney C. Harris, Fort Collins, CO (US); Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1018 days.

(21) Appl. No.: 10/326,622

(22) Filed: Dec. 20, 2002

(65) Prior Publication Data

US 2004/0170314 A1 Sep. 2, 2004

(51) Int. Cl.
*H04N 1/46* (2006.01)
*H04N 1/00* (2006.01)

(52) U.S. Cl. .................. 358/504; 358/406; 356/401

(58) Field of Classification Search ............... 358/504, 358/513, 406, 474, 482, 483; 356/399, 400, 356/401

See application file for complete search history.

(56) References Cited

U.S. PATENT DOCUMENTS

| | | | | |
|---|---|---|---|---|
| 4,724,330 A | * | 2/1988 | Tuhro | 356/614 |
| 5,144,455 A | | 9/1992 | Stein et al. | |
| 5,194,908 A | * | 3/1993 | Lougheed et al. | 356/28 |
| 5,384,621 A | * | 1/1995 | Hatch et al. | 399/42 |
| 5,757,425 A | * | 5/1998 | Barton et al. | 348/241 |
| 5,783,833 A | * | 7/1998 | Sugaya et al. | 250/548 |
| 6,163,376 A | * | 12/2000 | Nomura et al. | 356/401 |
| 6,353,486 B1 | | 3/2002 | Tsai | |
| 6,521,900 B1 | * | 2/2003 | Hirayanagi | 250/491.1 |
| 6,618,560 B2 | * | 9/2003 | Sensui | 396/114 |
| 2001/0019079 A1 | * | 9/2001 | Massieu et al. | 235/462.1 |
| 2003/0048444 A1 | * | 3/2003 | Takahashi | 356/400 |
| 2003/0053058 A1 | * | 3/2003 | Tanaka | 356/401 |
| 2004/0032575 A1 | * | 2/2004 | Nishi et al. | 355/53 |

FOREIGN PATENT DOCUMENTS

| | | |
|---|---|---|
| JP | 59201575 | 11/1984 |
| JP | 62015672 | 1/1987 |
| JP | 62277852 | 12/1987 |

OTHER PUBLICATIONS

U.S. Pending Application, "Digital Image Scanner With Compensation For Misalignment Of Photosensor Array Segments," U.S. Appl. No. 09/365,112, filed Jul. 30, 1999, Steven J. Kommrusch and Randy T. Crane, HP PDNO 10990561-1.

* cited by examiner

*Primary Examiner*—Jerome Grant, II

(57) ABSTRACT

A target, method, and apparatus are disclosed for measuring assembly and alignment errors in scanner sensor assemblies. The sensor assembly comprises at least two sensor segments. The target comprises edges defined by changes in reflectance. At least one vertical edge corresponds to each sensor segment, and can be detected only by its corresponding segment, even when the segments are misaligned to the maximum extent of their placement tolerances. The target may optionally comprise a horizontal edge spanning the sensor segments. The target is scanned, and the resulting digital image is analyzed to detect the apparent locations of the target edges. The apparent edge locations provide sufficient information to locate the sensor segments. The target may optionally be incorporated into a scanner, or into a separate alignment fixture. The analysis may be performed in a scanner, in a fixture, or in a host computer attached to a scanner or a fixture.

14 Claims, 5 Drawing Sheets

METHOD AND APPARATUS FOR MEASURING ASSEMBLY AND ALIGNMENT ERRORS IN SENSOR ASSEMBLIES

FIELD OF THE INVENTION

The present invention relates generally to image input scanning.

BACKGROUND OF THE INVENTION

A typical scanner uses a light source to illuminate a section of an original item. A lens or an array of lenses redirects light reflected from or transmitted through the original item so as to project an image of a scan line onto an array of light-sensitive elements. Each light-sensitive element produces an electrical signal related to the intensity of light falling on the element, which is in turn related to the reflectance, transmittance, or density of the corresponding portion of the original item. These electrical signals are read and assigned numerical values. A scanning mechanism typically sweeps the scan line across the original item, so that successive scan lines are read. By associating the numerical values with their corresponding location on the being scanned, a digital representation of the scanned item is constructed. When the digital representation is read and properly interpreted, an image of the scanned item can be reconstructed.

FIG. 1 depicts a perspective view of the imaging portion of a scanner using a contact image sensor. Much of the supporting structure, light shielding, and scanning mechanism have been omitted from the figure for clarity. A contact image sensor (CIS) uses an array of gradient index (GRIN) rod lenses 101 placed between a platen 102 and a segmented array of sensor segments 103 mounted on a printed circuit board 104. The sensor segments 103 contain the light-sensitive elements. A light source 105 provides the light needed for scanning of reflective original items. The electrical signals generated by the light-sensitive elements may be carried to other electronics (not shown) by cable 106. Each sensor segment 103 may sometimes be called a die.

FIG. 2 depicts a cross-section view of the CIS arrangement of FIG. 1, as it would be used to scan a reflective original. Light source 105 emits light 201, which illuminates the original 202. Some of the light reflects from the original and is captured by GRIN lenses 101. The GRIN lenses refocus the light onto light-sensitive elements 103, forming an image of the original 202. While an array of GRIN lenses comprising two staggered rows is shown, the lenses may be arranged in a single row, three rows, or some other arrangement.

Each of the light-sensitive segments is further divided into pixels. The term pixel may refer to an individually addressable light-sensitive element of sensor segments 103, or to the corresponding area of original 202 that is imaged onto that portion, or to each digital value corresponding to a location in a digital image.

FIG. 3 depicts a schematic plan view of a particular sensor segment 103, also showing the row of individual pixels 301 that each sensor segment 103 comprises. For clarity of illustration, only a few pixels are shown. An actual sensor segment may comprise hundreds or thousands of individual pixels. The number of pixels per linear unit of sensor defines the scanner's spatial sampling rate, which is also often called the scanner's resolution. A typical scanner may have a resolution of 300, 600, 1200, or 2400 pixels per inch, although other resolutions are possible.

The optical magnification of the CIS module is essentially unity, so the pixel sites 301 on sensor segments 103 are mapped to corresponding pixels on the original 202, and the pixels on original 102 are essentially the same size as the pixel sites 301. FIG. 4 depicts the pixels from three sensor segments of a multi-segment sensor array as projected onto the original 202. Ideally, some of the pixels of the segments overlap. That is, if the direction corresponding to the length of the segments, the X direction, is considered to define a row of pixels, and the transverse direction, the Y direction is thought to traverse columns of pixel locations, then the end pixel or pixels of one segment may be in the same column as the end pixels of another segment. For example, pixel 411 in segment 402 is essentially in the same column as pixel 410 in segment 401.

The X direction as shown is also sometimes called the main scanning direction, and the Y direction is sometimes called the subscanning direction.

During scanning, the set of segments is moved in the subscanning direction indicated by arrow 404. At one time, the pixels are in the position as shown in solid lines in FIG. 4 and are read. At later times corresponding to successive scan lines, the pixels are in the positions shown in dashed lines and are read. At a particular later time, pixel 411 will read essentially the same portion of original 202 that pixel 410 read earlier. When the scanner or host computer reassembles the data from the segments into a final digital representation of original 202, it may choose to use either the earlier reading from pixel 410 or the later reading from pixel 411 to represent that particular original location. This is a simple example of the process of constructing a complete final image from segments scanned at different times and locations. This process is sometimes called re-sampling or stitching.

In the idealized example of FIG. 4, the sensor segments 103 are placed perfectly parallel to each other, overlapped by exactly one pixel, and offset in the Y direction by exactly 3 pixels. In an actual scanner, however, this precision is not generally achievable. The positional accuracy of the pixels is determined primarily by the placement accuracy of the sensor segments 103 on circuit board 104. Each segment may be displaced from its ideal location in the X direction or the Y direction, or by being placed non-parallel to its ideal alignment. These errors may occur in any combination.

FIG. 5 depicts an exaggerated example of misplacement of the sensor segments 103. Each of segments 501, 502, and 503 is misplaced relative to its nominal position. One example result is that pixels 510 and 511 are displaced by about five scan lines in the Y direction rather than their nominal three scan lines. If the stitching means assumes that it should match pixels from segment 502 with pixels from segment 501 scanned three scan lines earlier, there will occur a "stitching artifact" at the boundary between the parts of the image scanned by segments 501 and 502. Segments 502 and 503 overlap in the X direction more than their nominal one pixel, and similar stitching artifacts may occur as a result. For example the stitching artifacts may cause smooth lines in the original 202 to appear disjointed or jagged in the resulting scanned image.

Previously, manufacturers of CIS modules have endeavored to avoid these stitching artifacts by controlling the placement of the sensor segments 103 onto the circuit board 104 as precisely and accurately as possible. Because the geometries involved are very small, it has not always been possible to reliably place the segments with errors small enough. Typically, modules with too much placement deviation have been rejected, reducing the manufacturing yield and ultimately increasing the cost of the modules that were acceptable.

This problem has been exacerbated as scanners have been produced with increasingly higher resolution. For example, a specification of a one pixel maximum placement error corresponds to a placement tolerance of about 84 microns for a scanner with a resolution of 300 pixels per inch. But the same one pixel specification corresponds to a placement tolerance of only about 10 microns for a scanner with a resolution of 2400 pixels per inch.

Pending U.S. patent application Ser. No. 09/365,112, having a common assignee with the present application, describes a method of compensating for die placement errors in a handheld scanner that comprises position sensors and a position correction system. However, that application describes only a particular compensation method, and not a method for characterizing the misalignments of the segments.

It may be possible to characterize the die placement errors using metrology equipment, but this would require significant time and expense, and also adds the complexity of a data tracking system for associating the measurement data with each CIS module.

To facilitate the minimization of stitching errors in scanned images, an inexpensive, convenient method is needed to characterize the sensor segment placement errors in a scanner optics module.

SUMMARY OF THE INVENTION

A target, method, and apparatus are disclosed for measuring assembly and alignment errors in scanner sensor assemblies. The sensor assembly comprises at least two sensor segments. The target comprises edges defined by changes in reflectance. At least one vertical edge corresponds to each sensor segment, and can be detected only by its corresponding segment, even when the segments are misaligned to the maximum extent of their placement tolerances. The target may optionally comprise a horizontal edge spanning the sensor segments. The target is scanned, and the resulting digital image is analyzed to detect the apparent locations of the target edges. The apparent edge locations provide sufficient information to locate the sensor segments. The target may optionally be incorporated into a scanner, or into a separate alignment fixture. The analysis may be performed in a scanner, in a fixture, or in a host computer attached to a scanner or a fixture.

DETAILED DESCRIPTION OF THE PREFERRED EMBODIMENT

Figure 1:
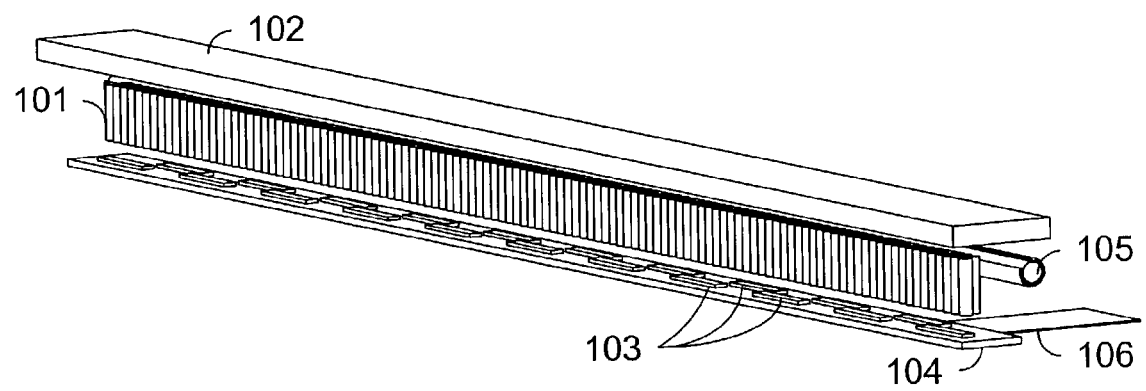
FIG. 1 depicts a perspective view of the imaging portion of a scanner using a contact image sensor.
Figure 2:
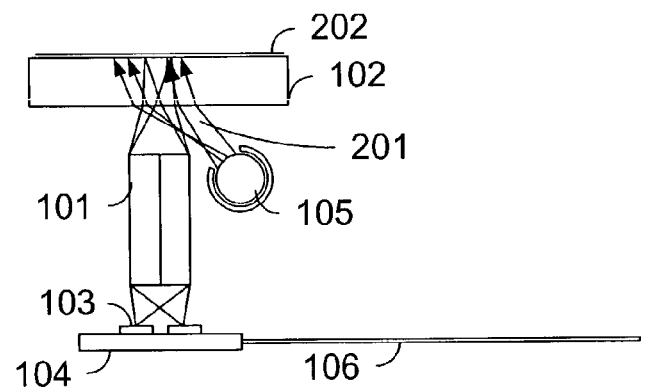
FIG. 2 depicts a cross-section view of the CIS arrangement of FIG. 1, as it would be used to scan a reflective original.
Figure 3:
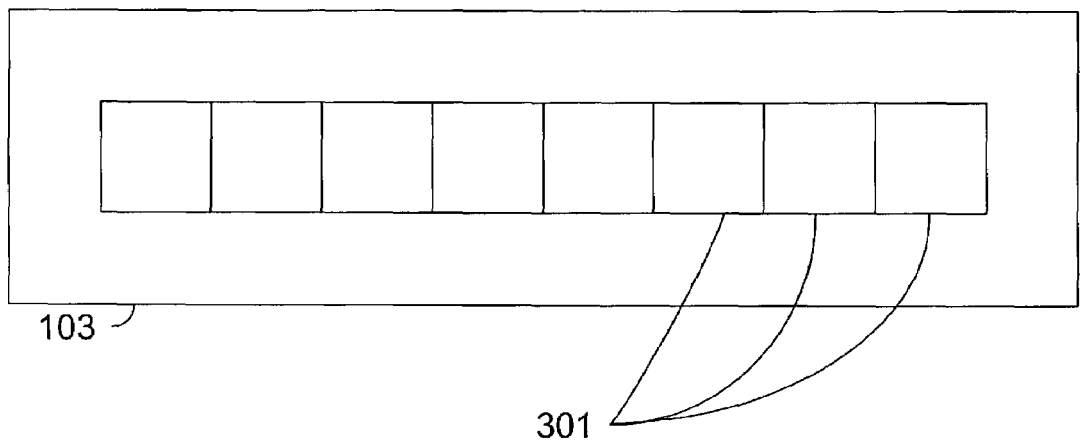
FIG. 3 depicts a schematic plan view of a particular sensor segment.
Figure 4:
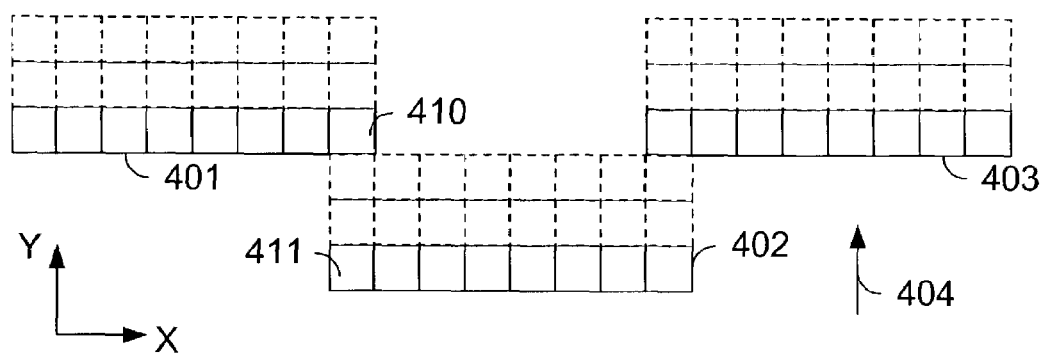
FIG. 4 depicts the pixels from three sensor segments as projected onto an original.
Figure 5:
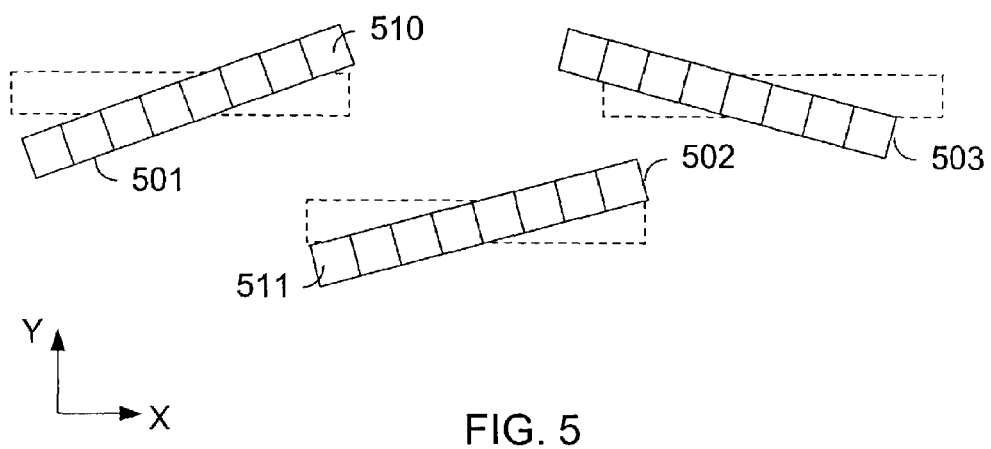
FIG. 5 depicts an exaggerated example of misplacement of the sensor segments.
Figure 6:
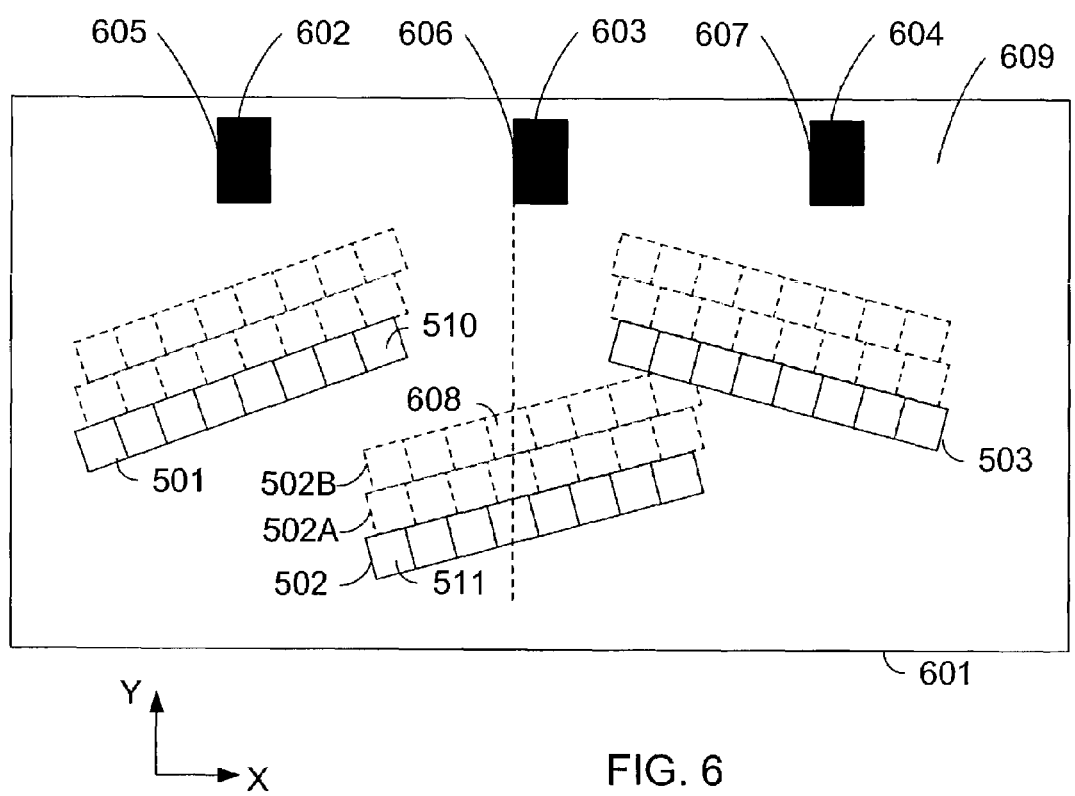
FIG. 6 depicts an example scanning target containing contrasting marks.

FIG. 6 depicts an example scanning target 601 containing contrasting marks 602, 603, 604. In this example embodiment, the background of the target is white and each contrasting mark is black, although other color or reflectance combinations may be used. Also superimposed on FIG. 6 are pixel locations that may be scanned by sensor segments 501, 502, and 503. Marks 602, 603, 604 are surrounded by a white field sufficiently large that the scanning mechanism may reliably place sensor segments 501, 502, and 503 entirely within the white fields, even if the sensor segments 501, 502, 503 depart from their nominal positions by the maximum extent of their permitted placement tolerances. Because the misalignment of the sensor segments 501, 502, 503 is exaggerated in FIG. 6, the target 601 may be shown larger than actually required.

Each of the marks 602, 603, 604 has at least one operative vertical edge. In this example, edge 605 is chosen as the operative vertical edge of mark 602, edge 606 is chosen for mark 603, and edge 607 is chosen for mark 604. The marks shown have other vertical edges, and the choice is arbitrary as long as the X-direction location of the edges is known to the pixel placement accuracy required of the eventual scanned image. Target 601 may be fabricated by high-precision printing onto a stable material and may be affixed under the platen of a typical scanner. Alternatively, the marks 602, 603, 604 may be printed on a portion of the scanner housing.

At least one mark is supplied for each sensor segment. The marks are placed preferably so that the nominal center of each segment will scan its corresponding mark when all of the components are placed at their nominal locations. In any event, the marks are placed such that each mark may be scanned only by its corresponding sensor segment, even if the segments are displaced from their nominal positions by the maximum extent of their permitted tolerances.

During the measurement process, target 601 is scanned. This process is depicted in FIG. 6 by the dashed lines showing successive positions of sensor segments 501, 502, 503 in relation to target 601. For example, at a particular time, segment 502 is at the location indicated by its solid outline. At a later time, when the scanning mechanism has moved one pixel, segment 502 is at location 502A. Still later, segment 502 is at location 502B. At each location, the image being seen by sensor segment 502 is read and converted to a digital representation. For example, in a scanner that can represent 256 levels of pixel brightness and that assigns higher values to brighter pixels, the digital image read by the eight light-sensitive elements, or pixels, of segment 502 in its first shown position may comprise eight digital values such as:

240 241 240 239 241 240 240 239 where the leftmost value corresponds to pixel 511.

Data read by segment 502 in successive positions 502A and 502B may be similar. However, when segment 502 encounters mark 603, some of the pixels of segment 502 will read the darker mark 603, and thus produce lower digital values. For example, the eight values produced by segment 502 as it scans mark 603 may be:

238 241 211 53 19 120 241 237 where again the leftmost value corresponds to pixel 511.

Edge 606 is the arbitrarily chosen operative vertical edge of interest for locating sensor segment 502. By examining the data values resulting from the scan of mark 603, edge 606 can be located in the X direction in relation to segment 502. One simple method is to attribute the edge location to the first pixel of segment 502 whose brightness reading falls below half the full scale reading of the scanner. In the above example set of digital values, the fourth pixel, shown as pixel 608 in FIG. 6, has a value of 53, which is less than half of this example scanner's full scale value of 256. In this simple example method, it may be determined that edge 606 falls at pixel 608, the fourth pixel of segment 502.

Because the position of edge 606 is precisely known, and the length of segment 502 is precisely known, and the relationship of edge 606 to segment 502 is precisely known, it is now known which portions of the scanner platen 102 will be scanned by segment 502. Each of the other sensor segments may be characterized in a similar way.

Since it is then known which portions of the scanner platen 102 will be scanned by each sensor segment, it may be determined which sensor segment pixel will scan any particular portion of the platen 102, even though the sensor segments may be placed onto printed circuit board 104 with considerable positional errors in the X direction. This characterization is a prerequisite to compensating for the positional errors using later image processing.

A more precise estimate of the position of sensor segment 502 may be obtained by interpolating between the digital values read by the sensor pixels. In the above example, the third pixel of segment 502 read a digital value of 211, and the fourth pixel (pixel 608) read a digital value of 53. By interpolating between these pixels, it is possible to get a more precise estimate of the location along sensor segment 502 where the digital values read by the pixels would be 128 (half the full scale reading of 256), and therefore a more precise estimate of the location of operative vertical edge 606.

Figure 7:
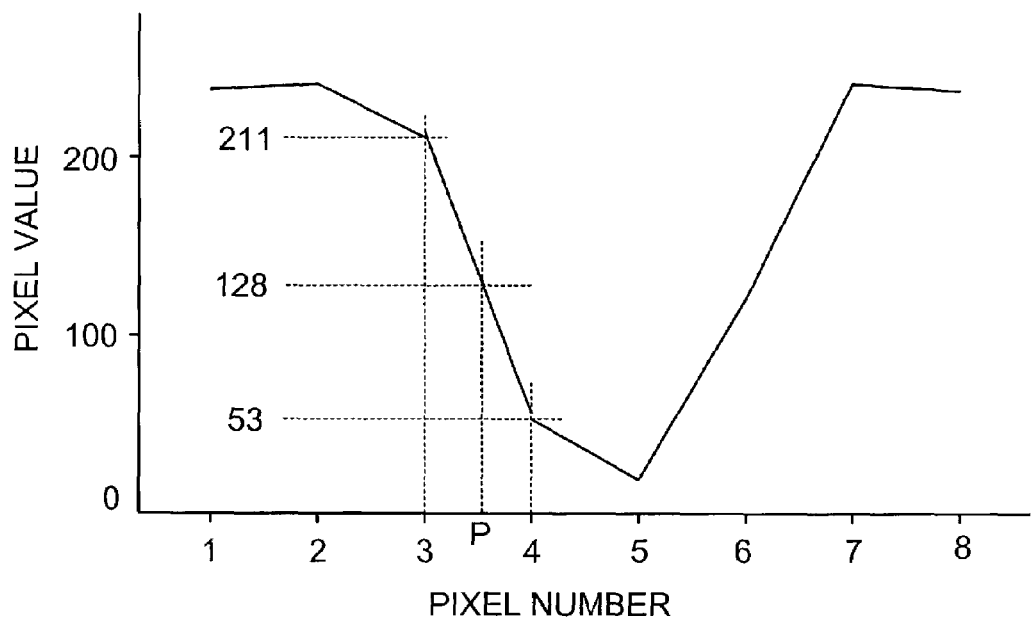
FIG. 7 illustrates interpolation.

FIG. 7 illustrates the interpolation. Pixel location p may be calculated from the relation:

$$\frac{p-3}{4-3} = \frac{128-211}{53-211}$$

from which may be determined that p≈3.52. In other words, operative vertical edge 606 is aligned with a point on sensor segment 502 approximately 3.52 pixels from the left end. Even if the eventual image processing does not place data in fractional pixel locations, having a more precise estimate of the placement of the sensor segments may reduce the possibility of unnecessary accumulation of errors between sensor segments.

Any computations and image processing may be done by the scanner, for example using a microprocessor, or by a host computer, or by a combination of these.

Figure 8:
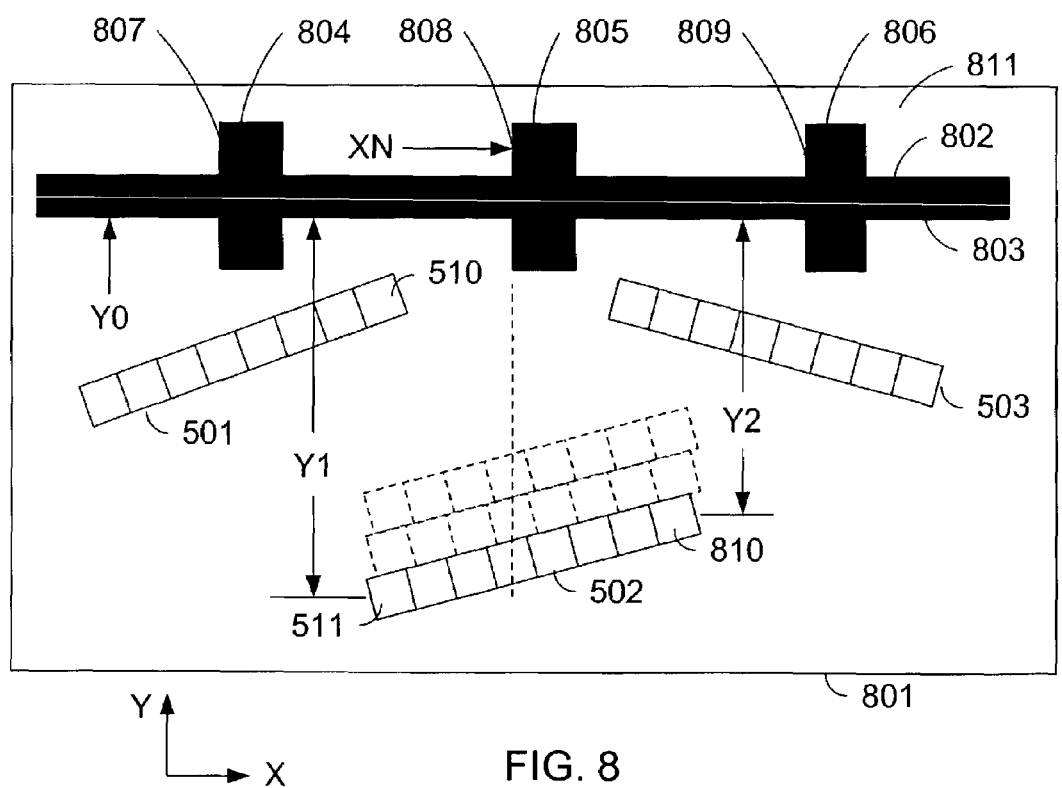
FIG. 8 shows an alternative example scanning target.

A similar technique may be used to characterize the sensor segment positions in the Y direction and the angular positions of the segments. FIG. 8 shows an alternative example scanning target 801 that may be used to characterize sensor segment positions in both the X and Y directions. Target 801 contains mark 802. Mark 802 has an operative horizontal edge 803, and superimposing marks 804, 805, and 806, having operative vertical edges 807, 808, and 809, respectively. Horizontal edge 803 may be thought of as interrupted by marks 804, 805, and 806. Also superimposed on the target 801 is a set of positions traversed by sensor segment 502 during scanning. As was described previously, the position of segment 502 may be measured in the X direction by examining successive pixels scanned by segment 502 while segment 502 is traversing mark 805. To measure the segment positions in the Y direction, successive readings of the same pixel are examined as the segments traverse horizontal edge 803. For example, the position of the left edge of segment 502 may be characterized by examining successive readings from pixel 511. The position may be recorded as the scanning mechanism position at which the digital value read from pixel 511 falls below half of a full scale reading (256 for the example scanner). Alternatively, the scanner or host may use interpolation, such as was described previously to, estimate a fractional position in the Y direction.

Similarly, the Y-direction location of pixel 810, the rightmost pixel of sensor segment 502, may be determined as the scanning mechanism position at which pixel 810 traverses horizontal edge 803. Once both end pixels have been located in the Y direction, the Y-direction position of the sensor segment is known, and the angular position of the segment may be ascertained from the difference in the Y-direction positions of the two end pixels.

For example, consider the case where the position of horizontal edge 803 is Y0, and the position of vertical edge 808 is XN, p is the pixel number within segment 502 where edge 808 is detected, Y1 is the distance the sensor array must move from a reference position to detect horizontal edge 803 with pixel 511, and Y2 is the distance the sensor array must move from the reference position to detect horizontal edge 803 with pixel 810. In this example, the distances are measured in scanner pixels, although other units may easily be used. The position of segment 502 may be completely characterized either by locating both of the end pixels 511 and 810 in the X and Y directions, or by locating a particular point on segment 502 in the X and Y directions and indicating the slope of the segment with respect to horizontal edge 803.

While the target is precisely manufactured, the presence of dust, dirt, or other matter may affect the results of the edge finding. These undesirable effects may be avoided by various statistical techniques. For example, the sensor may measure the location of vertical edge 808 at several locations, reject the high and low readings, and average the remaining readings. Other statistical methods will be apparent to one of skill in the art.

Y1, Y2, and p represent apparent target edge locations as seen by the sensor segments. Because the target is constructed precisely, any deviation from the nominal target position is attributed to positional errors in the sensor segments. The sensor segment locations are calculated from the apparent target edge locations.

For example, as depicted in FIG. 8:
Pixel 511 X position=(XN−p)
Pixel 511 Y position=Y0−Y1
Pixel 810 X position=XN+(Number of pixels in segment 502−1)−p
Pixel 810 Y position=Y0−Y2

In this example, it has been assumed that segment 502 is sufficiently nearly parallel to horizontal edge 803 to neglect the foreshortening in the X direction. In order to include the effect of the foreshortening, each X-direction deviation from XN would be multiplied by cos(arctan((Y2−Y1)/(Number of pixels in segment 502))).

Figure 9:
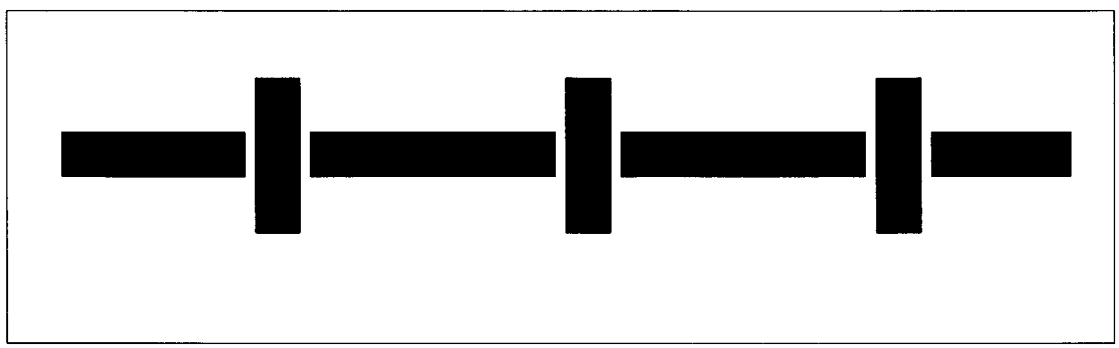
FIG. 9 depicts an example combined target 901 that may be used to measure both the X- and Y-direction positions of sensor segments, as well as the segments' angular orientations.

The positions of the other sensor segments may be determined in a similar manner. FIG. 9 depicts an alternative example embodiment of the combined target. Because of the interruptions of edge 803, edge 803 may be thought of as made up of several collinear edge segments.

One of skill in the art will recognize several variations of the targets, scanner, and method that embody the invention, and it is intended that the appended claims be interpreted to encompass such variations. For example, while targets having black markings on a white background 609, 811 have been described, other combinations may be used to provide the horizontal and vertical edges. A target could have white markings on a black background, or some other combination of colors or reflectances.

Each sensor segment described above has a single row of light-sensitive pixels. Some sensors include multiple rows of pixels, each row sensitive to a different set of light wavelengths. Usually the wavelength sensitivity is accomplished by placing filters over the rows. Such a sensor may be used to discern color information about an original item in addition to reflectance, transmittance, or density information. While single-row sensors were used for simplicity of explanation, it will be recognized that the present invention may easily be embodied with multiple-row sensors. It may be desirable to measure the position of each row independently, or it may be sufficient to measure a single row and compute the positions of the other rows based on their nominal relative positions.

The CIS module described above uses staggered sensor segments. That is, alternate segments are displaced in the Y-direction, and overlap in the X-direction. Some CIS modules abut the sensor segments end-to-end, forming a single long row of light-sensitive pixels. A non-staggered CIS is also subject to positional errors, and it will be recognized that the present invention may be embodied with a non-staggered CIS as well.

It will also be recognized that the invention may be embodied by placing a target within a scanner, or by placing a target in a separate characterization fixture. In the first case, the target may be placed under the scanner platen, in an area outside the area covered by an original item. The scanner may scan the target periodically and perform the necessary computations to discern the positions of the sensor segments. The computations may also be performed in a host computer connected to the scanner. In the second case, the target may be part of a separate characterization fixture used during the manufacturing of the scanner. The imaging portion of the scanner may be placed in the fixture and used to scan a target. A computer attached to the fixture may analyze the resulting digital image to discern the placement of the sensor segments. The placement information may be stored within the imaging portion of the scanner, for example in a non-volatile memory on the same circuit board 104 that holds the sensor segments 103. In this way, the scanner imaging portion and its placement information are conveniently associated with each other. Alternatively, the placement information may be transferred to the scanner or the scanner's host computer by other means, such as an electronic interface, so that the sensor segment positions are known for later image correction.

The foregoing description of the present invention has been presented for purposes of illustration and description. It is not intended to be exhaustive or to limit the invention to the precise form disclosed, and other modifications and variations may be possible in light of the above teachings. For example, the invention may be embodied in a scanner that scans a transmissive original item, using light that passes through the original item. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A target for measuring assembly and alignment errors in a multi-segment sensor assembly, the target comprising:
   a) a background;
   b) at least two marks that contrast with the background, each mark positioned such that it can be detected by only one segment of the multi-segment sensor assembly; and
   c) an operative vertical edge on each mark.

2. The target of claim 1 wherein the operative vertical edges are positioned with a precision at least equal to the magnitude of the segment position errors to be measured.

3. A target for measuring assembly and alignment errors in a multi-segment sensor assembly, the target comprising:
   a) a background; and
   b) a set of edges defined by areas contrasting with the background, the edges including;
      i. at least one horizontal edge spanning, substantially parallel to a main scanning direction, an area to be scanned by the sensor assembly; and
      ii. at least one vertical edge for each sensor assembly segment, each vertical edge generally perpendicular to the main scanning direction and positioned so that it may be detected by only one sensor assembly segment.

4. The target of claim 3 wherein the horizontal edge comprises at least two substantially collinear segments.

5. A method of measuring assembly and alignment errors in a multi-segment sensor assembly, the method comprising the steps of:
   a) scanning a target using a multi-segment sensor assembly, the target comprising at least one operative vertical edge for each sensor segment, the operative vertical edges positioned such that each edge can be detected by only one sensor segment;
   b) creating a digital image of the target;
   c) analyzing the digital image to detect the apparent locations of the target edges; and
   d) computing locations of the sensor segments from the apparent target edge locations.

6. The method of claim 5 wherein the step of analyzing the digital image to detect the apparent locations of the target edges further comprises detecting an operative horizontal edge.

7. The method of claim 6 wherein detecting an operative horizontal edge comprises detecting at least two substantially collinear horizontal edge segments.

8. The method of claim 5 further comprising the step of storing the locations of the sensor segments within a scanner imaging portion.

9. A scanner, comprising:
a) a multi-segment sensor assembly;
b) a target comprising at least one operative vertical edge for each sensor segment, the operative vertical edges positioned such that each edge can be detected by only one sensor segment; and
c) a microprocessor programmed to perform the following method:
   i. scanning the target;
   ii. creating a digital image of the target;
   iii. analyzing the digital image to detect the apparent locations of the target edges; and
   iv. computing locations of the sensor segments from the apparent target edge locations.

10. A fixture for characterizing a multi-segment sensor assembly, comprising:
a) a target comprising at least one operative vertical edge for each sensor segment, the operative vertical edges positioned such that each edge can be detected by only one sensor segment; and
b) a computer programmed to perform the following method:
   i. scanning the target;
   ii. creating a digital image of the target;
   iii. analyzing the digital image to detect the apparent locations of the target edges; and
   iv. computing locations of the sensor segments from the apparent target edge locations.

11. The fixture of claim 10 wherein the method further comprises the step of storing the locations of the sensor segments in a scanner imaging portion.

12. A system, comprising:
a) a scanner comprising:
   i. a multi-segment sensor assembly; and
   ii. a target comprising at least one operative vertical edge for each sensor segment, the operative vertical edges positioned such that each edge can be detected by only one sensor segment; and
b) a computer;
the system programmed to perform the following method:
   i. scanning the target;
   ii. creating a digital image of the target;
   iii. analyzing the digital image to detect the apparent locations of the target edges; and
   iv. computing locations of the sensor segments from the apparent target edge locations.

13. A scanner, comprising:
a) a multi-segment sensor assembly;
b) a target comprising at least one operative vertical edge for each segment of the multi-segment sensor assembly, each operative vertical edge detectable by only one sensor segment;
c) means for scanning the target with the multi-segment sensor assembly and creating a digital image;
d) means for analyzing the digital image to detect the apparent locations of the target edges; and
e) means for computing the positions of the sensor segments from the apparent locations of the target edges.

14. The scanner of claim 13 wherein the target further comprises an operative horizontal edge.

* * * * *

UNITED STATES PATENT AND TRADEMARK OFFICE
CERTIFICATE OF CORRECTION

PATENT NO.        : 7,265,881 B2                                        Page 1 of 1
APPLICATION NO. : 10/326622
DATED             : September 4, 2007
INVENTOR(S)       : Rodney C. Harris et al.

It is certified that error appears in the above-identified patent and that said Letters Patent is hereby corrected as shown below:

On the Title page, in field (56), under "Foreign Patent Documents", in column 2, line 2, delete "JP   62015672   1/1987" and insert -- JP   62016672   1/1987 --, therefor.

In column 1, line 25, insert -- item -- before "being".

Signed and Sealed this

Eighteenth Day of August, 2009

David J. Kappos
*Director of the United States Patent and Trademark Office*